United States Patent
Edo et al.

(10) Patent No.: US 12,223,739 B2
(45) Date of Patent: Feb. 11, 2025

(54) OBSTACLE DETECTION SYSTEM, AGRICULTURAL WORK VEHICLE, OBSTACLE DETECTION PROGRAM, RECORDING MEDIUM ON WHICH OBSTACLE DETECTION PROGRAM IS RECORDED, AND OBSTACLE DETECTION METHOD

(71) Applicant: Kubota Corporation, Osaka (JP)

(72) Inventors: Shunsuke Edo, Sakai (JP); Kenichi Iwami, Sakai (JP); Shunsuke Miyashita, Sakai (JP)

(73) Assignee: Kubota Corporation, Osaka (JP)

( * ) Notice: Subject to any disclaimer, the term of this patent is extended or adjusted under 35 U.S.C. 154(b) by 339 days.

(21) Appl. No.: 17/609,544

(22) PCT Filed: May 20, 2020

(86) PCT No.: PCT/JP2020/019932
§ 371 (c)(1),
(2) Date: Nov. 8, 2021

(87) PCT Pub. No.: WO2020/261823
PCT Pub. Date: Dec. 30, 2020

(65) Prior Publication Data
US 2022/0230444 A1 Jul. 21, 2022

(30) Foreign Application Priority Data
Jun. 27, 2019 (JP) .................................. 2019-120480

(51) Int. Cl.
*G06V 20/58* (2022.01)
*A01B 69/04* (2006.01)
(Continued)

(52) U.S. Cl.
CPC ............ *G06V 20/58* (2022.01); *A01B 69/008* (2013.01); *A01B 76/00* (2013.01); *A01D 41/127* (2013.01);
(Continued)

(58) Field of Classification Search
CPC ...... G06V 10/82; G06V 10/25; G06V 10/255; A01B 69/008; A01B 76/00; A01B 69/001;
(Continued)

(56) References Cited

U.S. PATENT DOCUMENTS

2007/0008182 A1* 1/2007 Miyahara .............. G01S 13/867
340/937
2008/0231702 A1 9/2008 Matsumoto et al.
(Continued)

FOREIGN PATENT DOCUMENTS

CN 109344687 A 2/2019
EP 3299995 A1 3/2018
(Continued)

*Primary Examiner* — Jason Holloway
*Assistant Examiner* — Benjamin J Brosh
(74) *Attorney, Agent, or Firm* — The Webb Law Firm (57) ABSTRACT

An obstacle detection system for an agricultural work vehicle includes: an obstacle estimation unit that estimates a region in a field based on a detection signal from an obstacle sensor in which region an obstacle is present, and outputs obstacle present region information; an image capturing unit that outputs a captured image of the field; an obstacle detection unit that detects the obstacle from an input image and outputs obstacle detection information; and an image preprocessing unit that generates, as an image to be input to the obstacle detection unit, a trimmed image obtained by trimming the captured image so as to include the region in which the obstacle is present, based on the obstacle present
(Continued)

region information and shooting-angle-of-view information regarding the image capturing unit.

6 Claims, 4 Drawing Sheets

(51) Int. Cl.
  *A01B 76/00*     (2006.01)
  *A01D 41/127*    (2006.01)
  *A01D 75/18*     (2006.01)
  *G05D 1/00*      (2006.01)
  *G06T 11/00*     (2006.01)
  *G06V 10/82*     (2022.01)

(52) U.S. Cl.
  CPC .......... *A01D 75/185* (2013.01); *G05D 1/0214* (2013.01); *G05D 1/0238* (2013.01); *G05D 1/0255* (2013.01); *G05D 1/0259* (2013.01); *G06T 11/00* (2013.01); *G06V 10/82* (2022.01); *G06T 2210/22* (2013.01)

(58) Field of Classification Search
  CPC .............. A01D 41/127; A01D 41/1274; A01D 41/1278; A01D 75/185; A01D 75/20; G05D 1/0214; G05D 1/0221; G05D 1/0238; G05D 1/0255; G05D 1/0259; G05D 2201/0201; G06T 11/00; G06T 2210/22
  See application file for complete search history.

(56) References Cited

U.S. PATENT DOCUMENTS

| | | | |
|---|---|---|---|
| 2017/0206426 | A1 | 7/2017 | Schrier et al. |
| 2017/0269591 | A1* | 9/2017 | Tanaka ................. G05D 1/0223 |
| 2018/0084708 | A1* | 3/2018 | Neitemeier .......... A01B 69/001 |
| 2018/0206392 | A1* | 7/2018 | Matsuzaki ........... A01B 69/008 |
| 2018/0330615 | A1 | 11/2018 | Yamanaka et al. |
| 2018/0373942 | A1* | 12/2018 | Noda ....................... G06N 3/02 |
| 2019/0096086 | A1 | 3/2019 | Xu et al. |
| 2019/0163190 | A1 | 5/2019 | Ono |
| 2020/0148203 | A1 | 5/2020 | Taniguchi et al. |

FOREIGN PATENT DOCUMENTS

| | | |
|---|---|---|
| EP | 3466239 A1 | 4/2019 |
| EP | 3494770 A1 | 6/2019 |
| JP | 200399789 A | 4/2003 |
| JP | 2006343198 A | 12/2006 |
| JP | 200725739 A | 2/2007 |
| JP | 2008230476 A | 10/2008 |
| JP | 201223505 A | 2/2012 |
| JP | 2016224854 A | 12/2016 |
| JP | 2018194912 A | 12/2018 |
| JP | 2018197945 A | 12/2018 |
| JP | 20194772 A | 1/2019 |
| JP | 201997454 A | 6/2019 |
| WO | 2018207303 A1 | 11/2018 |
| WO | 2018235486 A1 | 12/2018 |

* cited by examiner

OBSTACLE DETECTION SYSTEM, AGRICULTURAL WORK VEHICLE, OBSTACLE DETECTION PROGRAM, RECORDING MEDIUM ON WHICH OBSTACLE DETECTION PROGRAM IS RECORDED, AND OBSTACLE DETECTION METHOD

CROSS-REFERENCE TO RELATED APPLICATIONS

This application is the United States national phase of International Application No. PCT/JP2020/019932 filed May 20, 2020, and claims priority to Japanese Patent Application No. 2019-120480 filed Jun. 27, 2019, the disclosures of which are hereby incorporated by reference in their entirety.

BACKGROUND OF THE INVENTION

Field of the Invention

The present invention relates to an obstacle detection system for an agricultural work vehicle that performs work in a field while traveling in the field.

Description of Related Art

JP 2019-004772A (Patent Document 1) discloses a harvester that includes an image recognition module that estimates a region in a field in which an obstacle is present by using a captured image acquired using a camera provided in a machine body. The image recognition module is built using a neural network technology in which deep learning is adopted.

Patent Document 1: JP 2019-004772A

SUMMARY OF THE INVENTION

In obstacle detection described in Patent Document 1, a captured image is used as an input image and an obstacle is detected using a neural network for which deep learning is adopted. The shooting field of view of the captured image used as the input image in such a neural network is the front side in a traveling direction, and the captured image has a large image size. Accordingly, if an obstacle is far from the camera, the obstacle in the captured image is small, arithmetic operations need to be performed a large number of times for the obstacle detection, and an expensive high-performance arithmetic unit is required in order to detect the obstacle in a short time.

Therefore, there is demand for an obstacle detection system for an agricultural work vehicle that has excellent cost performance.

An obstacle detection system for an agricultural work vehicle according to the present invention includes: an obstacle sensor configured to detect an obstacle in a field; an obstacle estimation unit configured to estimate a region in the field based on a detection signal from the obstacle sensor in which region the obstacle is present and output obstacle present region information; an image capturing unit configured to capture an image of the field and output the captured image; an image preprocessing unit configured to generate a trimmed image based on the obstacle present region information and shooting-angle-of-view information regarding the image capturing unit which trimmed image is obtained by trimming the captured image so as to include the region in which the obstacle is present based on the obstacle present region information and shooting-angle-of-view information regarding the image capturing unit; and an obstacle detection unit configured to receive the trimmed image as an input image and output obstacle detection information that includes a result of the detection of the obstacle.

The obstacle detection system includes the obstacle sensor that detects an obstacle in the field and the obstacle detection unit that detects the obstacle using a captured image. When the obstacle is detected by the obstacle sensor, obstacle present region information that indicates a region in which the obstacle is present is output. The image preprocessing unit determines an obstacle present region in the captured image obtained from the image capturing unit, by using the obstacle present region information, and trims the captured image so as to include the obstacle present region. The trimmed image obtained by the trimming includes the obstacle (reflection body), but the image size of the trimmed image is reduced (the number of pixels is reduced) as compared with the original captured image. Since this trimmed image is used as an input image that is input to the obstacle detection unit, an arithmetic operation load on the obstacle detection unit, e.g., an arithmetic operation load in image recognition processing is reduced. Therefore, cost performance of the obstacle detection unit is improved.

When the obstacle detected by the obstacle detection unit is located on the front side in a traveling direction of the agricultural work vehicle, the agricultural work vehicle needs to avoid the obstacle. Even when the obstacle is not located on the front side in the traveling direction of the agricultural work vehicle, there is a possibility of the obstacle coming close to the agricultural work vehicle. Therefore, in a preferred embodiment of the present invention, travel control of the agricultural work vehicle is changed to obstacle avoidance control based on the obstacle detection information output from the obstacle detection unit. It is preferable that the obstacle avoidance control includes deceleration, stopping, or turning of the agricultural work vehicle, for example.

In a preferred embodiment of the present invention, the obstacle sensor is a scanning-type sensor that uses ultrasonic beams, optical beams, or electromagnetic wave beams, and is configured to output the detection signal based on reflection beams that return to the obstacle sensor as a result of transmitted beams reflecting off a reflection body, and the obstacle estimation unit is configured to calculate a three-dimensional position of the obstacle from the detection signal with use of the reflection body as the obstacle, and output the obstacle present region information including the three-dimensional position. Such a scanning-type sensor can probe a wide area around the agricultural work vehicle in a short cycle, and a distance to an obstacle can be calculated based on the time it takes for the beams to return. Accordingly, the obstacle estimation unit calculates a three-dimensional position of the obstacle based on a detection signal from such a scanning-type obstacle sensor, and outputs the calculated three-dimensional position as the obstacle present region information. The image preprocessing unit can accurately calculate the position of the obstacle in the captured image based on the three-dimensional position of the obstacle and the shooting-angle-of-view information regarding the image capturing unit that captures the captured image, and can generate a trimmed image by extracting a region including the obstacle from the captured image.

An image recognition unit that uses pattern matching is conventionally known as an obstacle detection unit that uses, as an input image, an image obtained by performing preprocessing on a captured image. Furthermore, in recent years, an obstacle detection unit that accurately sorts obstacles according to their types (human, animal, etc.) by using a machine-learned neural network is known. In order to build a machine-learned neural network, a high-performance arithmetic unit is required. However, if an appropriately trimmed image is used as an input image, a good estimation result can be output even by a general-purpose arithmetic unit. Therefore, in a preferred embodiment of the present invention, the obstacle detection unit is configured as a machine-learned neural network, and the obstacle detection information output based on the input image includes a type of the obstacle.

The present invention is also applied to an agricultural work vehicle in which the obstacle detection system described above is installed. The agricultural work vehicle includes: an obstacle sensor configured to detect an obstacle in a surrounding region of the agricultural work vehicle; an obstacle estimation unit configured to estimate a region based on a detection signal from the obstacle sensor in which region the obstacle is present and output obstacle present region information; an image capturing unit configured to capture an image of a surrounding region of the agricultural work vehicle and output the captured image; an image preprocessing unit configured to generate a trimmed image based on the obstacle present region information and shooting-angle-of-view information regarding the image capturing unit which trimmed image is obtained by trimming the captured image so as to include the region in which the obstacle is present; and an obstacle detection unit configured to receive the trimmed image as an input image and output obstacle detection information that includes a result of the detection of the obstacle.

The present invention is also applied to an obstacle detection program for an agricultural work vehicle. The obstacle detection program includes: an obstacle estimation function of, based on a detection signal from an obstacle sensor that detects the obstacle in a surrounding region of the agricultural work vehicle, estimating a region in which an obstacle is present, and outputting obstacle present region information; an image preprocessing function of generating a trimmed image, which is obtained by trimming a captured image of a surrounding region of the agricultural work vehicle so as to include the region in which the obstacle is present, based on the captured image, shooting-angle-of-view information regarding an image capturing unit that captured the captured image, and the obstacle present region information; and an obstacle detection function of receiving the trimmed image as an input image and outputting obstacle detection information that includes a result of the detection of the obstacle.

The present invention is also applied to a recording medium on which an obstacle detection program for an agricultural work vehicle is recorded. The obstacle detection program recorded on the recording medium includes: an obstacle estimation function of estimating a region based on a detection signal from an obstacle sensor that detects the obstacle in a surrounding region of the agricultural work vehicle in which an obstacle is present, and outputting obstacle present region information; an image preprocessing function of generating a trimmed image, which is obtained by trimming a captured image of a surrounding region of the agricultural work vehicle so as to include the region in which the obstacle is present, based on the captured image, shooting-angle-of-view information regarding an image capturing unit that captured the captured image, and the obstacle present region information; and an obstacle detection function of receiving the trimmed image as an input image and that outputs obstacle detection information that includes a result of the detection of the obstacle.

The present invention is also applied to an obstacle detection method for an agricultural work vehicle. The obstacle detection method includes: estimating a region based on a detection signal from an obstacle sensor that detects the obstacle in a surrounding region of the agricultural work vehicle in which region an obstacle is present, and outputting obstacle present region information; generating a trimmed image, which is obtained by trimming a captured image of a surrounding region of the agricultural work vehicle so as to include the region in which the obstacle is present, based on the captured image, shooting-angle-of-view information regarding an image capturing unit that captured the captured image, and the obstacle present region information; and receiving the trimmed image as an input image and outputting obstacle detection information that includes a result of the detection of the obstacle.

The operations, effects, and various embodiments described above for the obstacle detection system according to the present invention are also applicable to the agricultural work vehicle according to the present invention in which the obstacle detection system is installed, the obstacle detection program according to the present invention, the recording medium on which the obstacle detection program for an agricultural work vehicle according to the present invention is recorded, and the obstacle detection method according to the present invention.

DETAILED DESCRIPTION OF PREFERRED EMBODIMENTS

An embodiment of the present invention will be described based on the drawings. In the following description, the direction of an arrow F and the direction of an arrow B shown in FIGS. 1 and 2 will be referred to as the "front" and the "back", respectively, unless otherwise specified. Also, the direction of an arrow L and the direction of an arrow R shown in FIG. 2 will be referred to as the "left" and the "right", respectively. Also, the direction of an arrow U and the direction of an arrow D shown in FIG. 1 will be referred to as "up" and "down", respectively.

Figure 1:
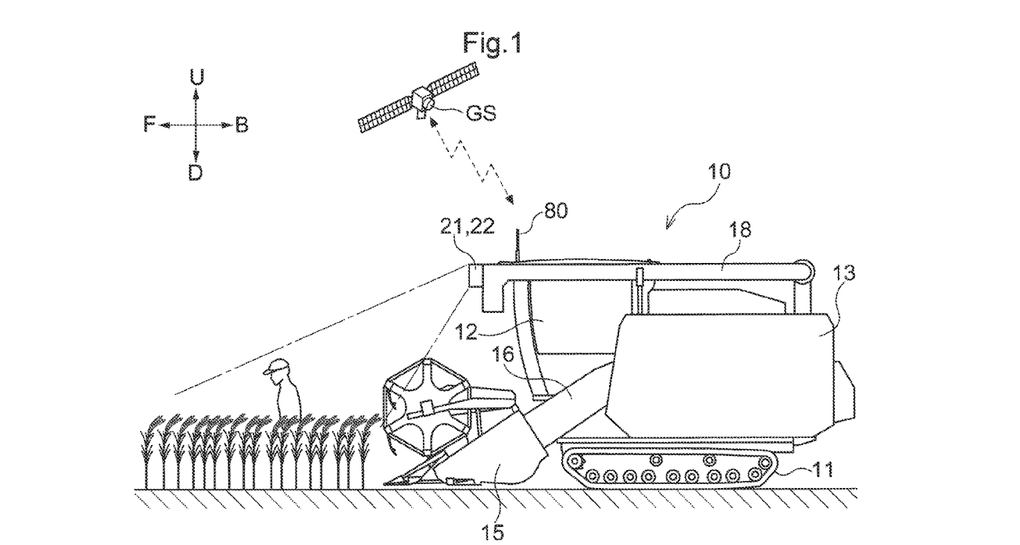
FIG. 1 is a side view of a combine.
Figure 2:
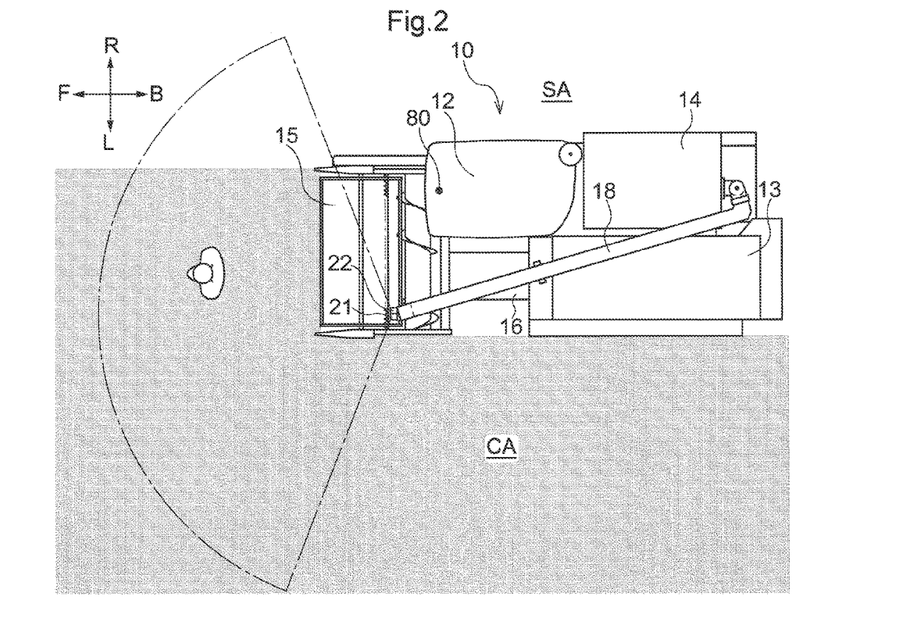
FIG. 2 is a plan view of the combine.

As shown in FIGS. 1 and 2, a normal-type combine that is an embodiment of an agricultural work vehicle in which an obstacle detection system according to the present invention is installed includes a crawler-type traveling device 11, a driving unit 12, a threshing device 13, a grain tank 14, a harvesting unit 15, a conveying device 16, a grain discharge device 18, and a satellite positioning module 80. Main constitutional elements of the combine will be collectively referred to as a "machine body 10" of the combine, but in some cases, the term "machine body 10" refers to an individual constitutional element such as the traveling device 11 or the harvesting unit 15.

The traveling device 11 is provided in the lower portion of the combine. Also, the traveling device 11 is driven by motive power from an engine (not shown). The driving unit 12, the threshing device 13, and the grain tank 14 are provided above the traveling device 11. An operator who monitors the work of the combine can ride in the driving unit 12. Note that the operator may monitor the work of the combine from outside the combine.

The grain discharge device 18 is provided above the threshing device 13 and the grain tank 14. Also, the satellite positioning module 80 is attached to the upper surface of the ceiling of a cabin that constitutes the driving unit 12. The satellite positioning module 80 acquires a machine body position by receiving GNSS (Global Navigation Satellite System) signals (including GPS signals) from an artificial satellite GS. In order to complement satellite navigation performed by the satellite positioning module 80, an inertial navigation unit that includes a gyroscope acceleration sensor and a magnetic direction sensor is included in the satellite positioning module 80. Of course, the inertial navigation unit may be arranged at a different position in the combine separately from the satellite positioning module 80.

The harvesting unit 15 is provided in the front portion of the combine. The conveying device 16 is provided so as to span a back end portion of the harvesting unit 15 and a front end portion of the threshing device 13. The harvesting unit 15 and the conveying device 16 are configured to be swingable in the vertical direction about an axis extending in a machine body transverse direction as a result of a stretching or contracting operation of a hydraulic cylinder (not shown).

The harvesting unit 15 rakes in planted culm to be harvested and reaps planted culm in a field. Thus, the harvesting unit 15 harvests planted culm in the field. The combine travels using the traveling device 11 while reaping planted culm in the field using the harvesting unit 15.

The reaped culm that was reaped by the harvesting unit 15 is conveyed to the threshing device 13 by the conveying device 16. The reaped culm is threshed in the threshing device 13. The grain obtained by the threshing is stored in the grain tank 14. The grain stored in the grain tank 14 is discharged to the outside of the machine by the grain discharge device 18 as needed.

As shown in FIGS. 1 and 2, in the combine, a LIDAR (Laser Imaging Detection and Ranging) 21, which is an example of a scanning beam-type obstacle sensor, is attached to the front end of the grain discharge device 18. The LIDAR 21 emits pulsed laser beams (transmitted beams) as scanning beams and detects reflection beams that have reflected off a reflection body such as an obstacle. A distance to the reflection body can be calculated based on a propagation time of the beams. The LIDAR 21 can perform scanning with laser beams in the horizontal direction, and accordingly, substantially three-dimensional scanning can also be performed by arranging scanning planes of a plurality of LIDARs 21 in the vertical direction. In this embodiment, two LIDARs 21 that have a horizontal scanning angle greater than at least 120° are arranged separately at a level equal to or lower than the height of planted culm and a level higher than the height of the planted culm.

Furthermore, a camera 22 that is an image capturing unit that outputs a captured image of the field is also attached to the front end of the grain discharge device 18. The shooting range of the camera 22 is a portion of the field on the front side in a traveling direction of the combine. The attachment position of the camera 22 can be adjusted, but after the adjustment, the camera 22 is fixed and the shooting angle of view of the camera 22 is determined. In this embodiment, a wide angle lens is attached to the camera 22, and the shooting angle of view of the camera 22 is approximately 120°.

Figure 3:
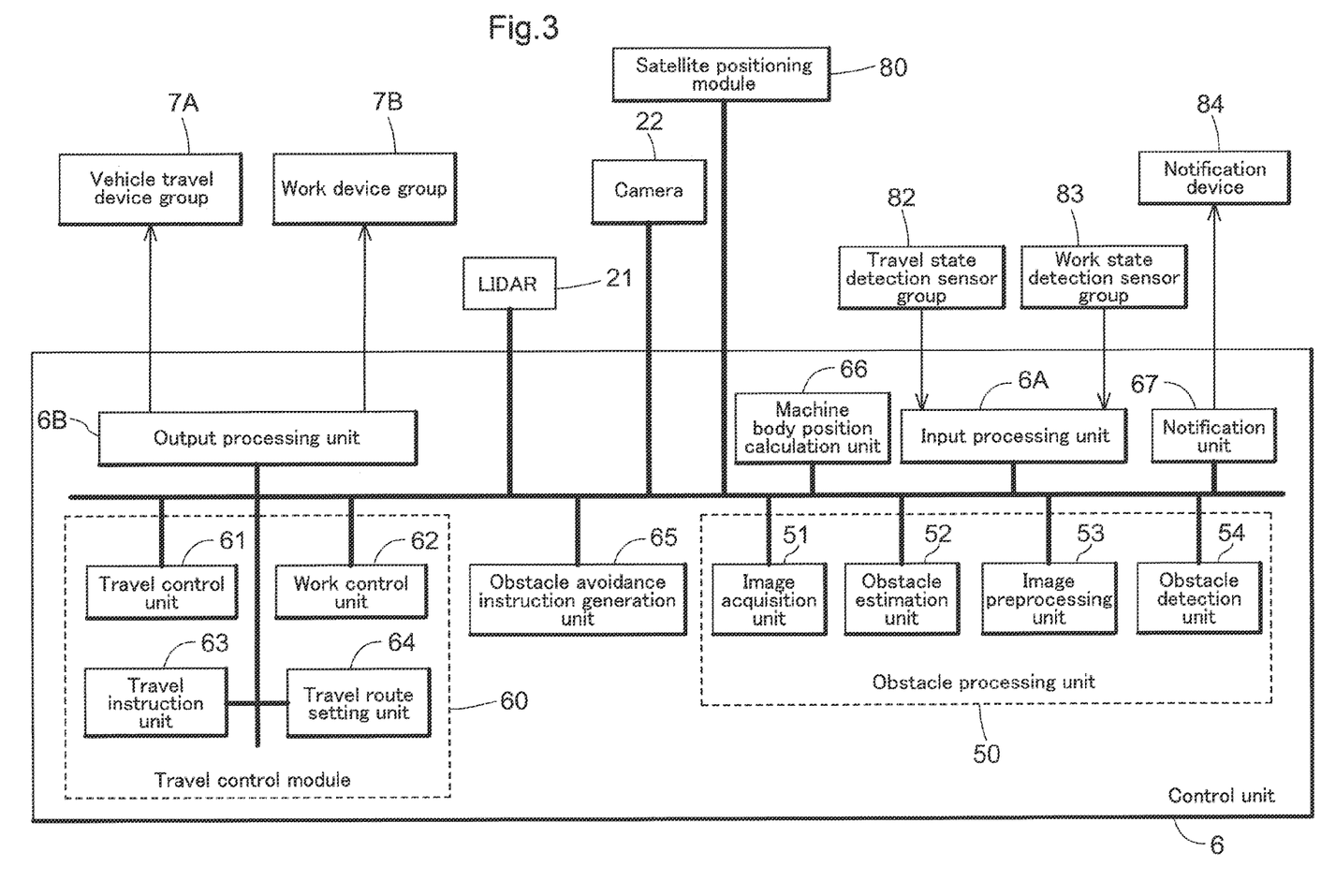
FIG. 3 is a functional block diagram of a control system of the combine.

FIG. 3 shows a functional block diagram of a control system of the combine. The control system of this embodiment is constituted by many electronic control units called ECUs, various operation devices, sensor groups, switch groups, and a wiring network such as an in-vehicle LAN for data transmission between these elements. A notification device 84 is a device for giving notification of a warning about an obstacle detection result, the state of work travel, or the like to the driver or the like, and is constituted by a buzzer, a lamp, a speaker, a display, or the like.

A control unit 6 is the core element of the control system and is shown as a collection of a plurality of ECUs. Positioning data from the satellite positioning module 80, a captured image from the camera 22, and a detection signal from the LIDARs 21 are input to the control unit 6 via the wiring network.

The control unit 6 includes an output processing unit 6B and an input processing unit 6A as input-output interfaces. The output processing unit 6B is connected to a vehicle travel device group 7A and a work device group 7B. The vehicle travel device group 7A includes control devices relating to travel of the vehicle, such as an engine control device, a transmission control device, a brake control device, and a steering control device. The work device group 7B includes motive power control devices and the like for the harvesting unit 15, the conveying device 16, the threshing device 13, and the grain discharge device 18.

A travel state detection sensor group 82, a work state detection sensor group 83, and the like are connected to the input processing unit 6A. The travel state detection sensor group 82 includes sensors for detecting states of an engine speed adjusting device, an acceleration pedal, a brake pedal, a gear shift operation device, and the like. The work state detection sensor group 83 includes sensors for detecting device states of the harvesting unit 15, the conveying device 16, the threshing device 13, and the grain discharge device 18, and states of culm and grains in these devices.

The control unit 6 includes a travel control module 60, an obstacle processing unit 50, an obstacle avoidance instruction generation unit 65, a machine body position calculation unit 66, and a notification unit 67. In this embodiment, the obstacle detection system is constituted by the LIDARs 21, the camera 22, the machine body position calculation unit 66, and the obstacle processing unit 50.

The notification unit 67 generates notification data based on requests from functional units of the control unit 6 and gives the notification data to the notification device 84. The machine body position calculation unit 66 calculates a machine body position that is at least one specific position on the machine body 10, for example, the position of the harvesting unit 15, expressed with coordinates on a map (or coordinates in the field), based on positioning data successively sent from the satellite positioning module 80.

The combine in this embodiment can perform both automatic travel (automatic steering) and manual travel (manual steering). The travel control module 60 includes a travel instruction unit 63 and a travel route setting unit 64, in addition to a travel control unit 61 and a work control unit 62. A travel mode switch (not shown) for selecting either an automatic travel mode in which the combine travels with automatic steering or a manual steering mode in which the combine travels with manual steering is provided in the driving unit 12. By operating the travel mode switch, it is possible to cause the combine to shift from manual steering travel to automatic steering travel or from automatic steering travel to manual steering travel.

The travel control unit 61 has an engine control function, a steering control function, a vehicle speed control function, and the like, and gives a travel control signal to the vehicle travel device group 7A. The work control unit 62 gives a work control signal to the work device group 7B to control movement of the harvesting unit 15, the threshing device 13, the grain discharge device 18, the conveying device 16, and the like.

The travel route setting unit 64 loads travel routes for automatic travel into a memory. The travel routes loaded into the memory are successively used as target travel routes in automatic travel. Even during manual travel, the travel routes can be used for guidance to make the combine travel along the travel routes.

The travel instruction unit 63 generates an automatic steering instruction and a vehicle speed instruction as automatic travel instructions, and gives the instructions to the travel control unit 61. The automatic steering instruction is generated to eliminate a directional divergence and a positional divergence between a travel route set by the travel route setting unit 64 and a machine position calculated by the machine body position calculation unit 66. At the time of automatic travel, the vehicle speed instruction is generated based on a vehicle speed value that is set in advance. At the time of manual travel, the vehicle speed instruction is generated based on a manual vehicle speed operation. However, in case of emergency such as when an obstacle is detected, a vehicle speed change including a force stop, an engine stop, or the like is automatically performed.

When the automatic travel mode is selected, the travel control unit 61 controls devices in the vehicle travel device group 7A relating to steering and devices in the vehicle travel device group 7A relating to the vehicle speed based on automatic travel instructions given from the travel instruction unit 63. When the manual travel mode is selected, the travel control unit 61 generates a control signal based on an operation performed by the driver and controls the vehicle travel device group 7A.

Figure 4:
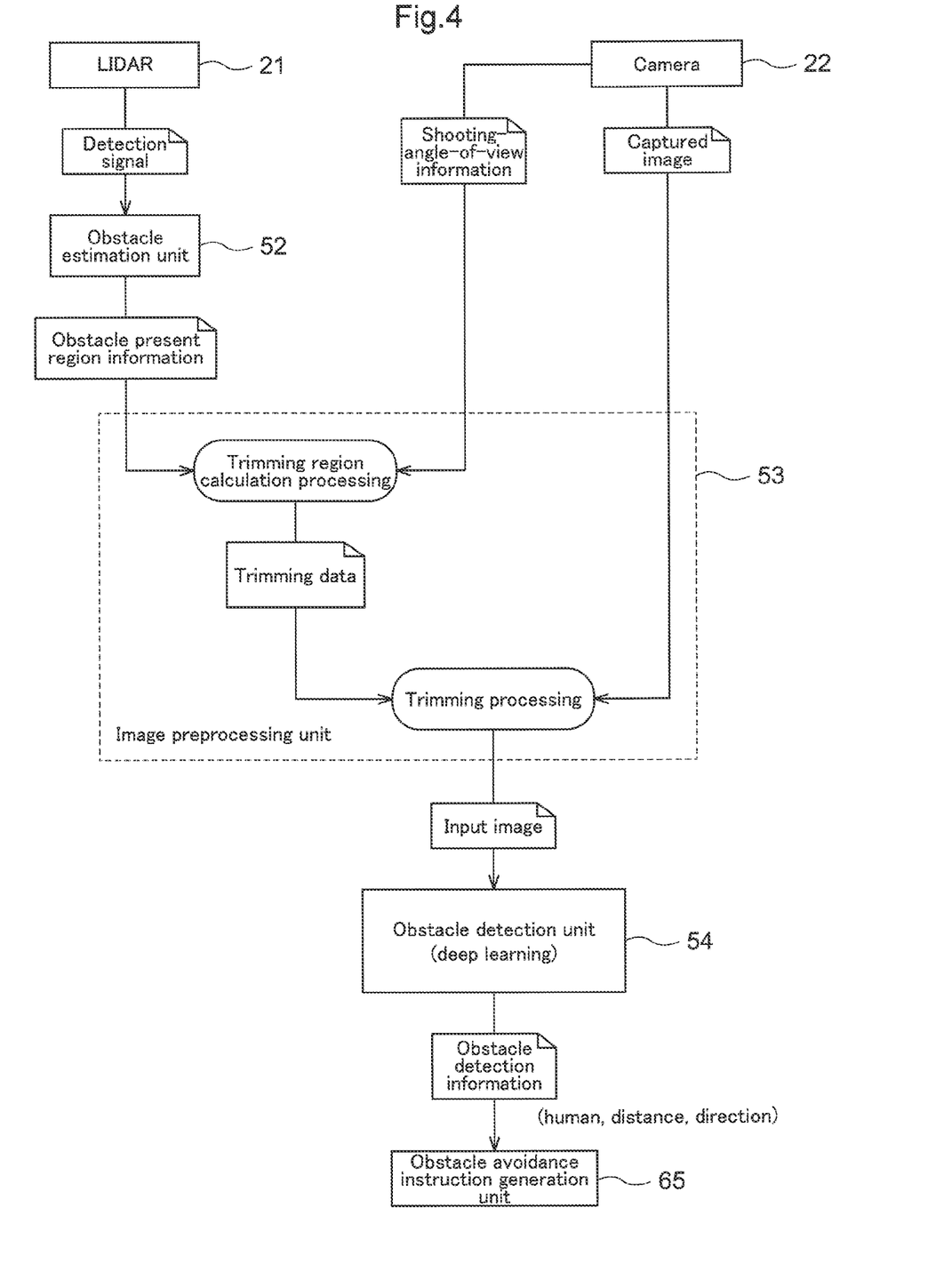
FIG. 4 is a schematic diagram showing a flow of control performed in an obstacle detection system.
Figure 5:
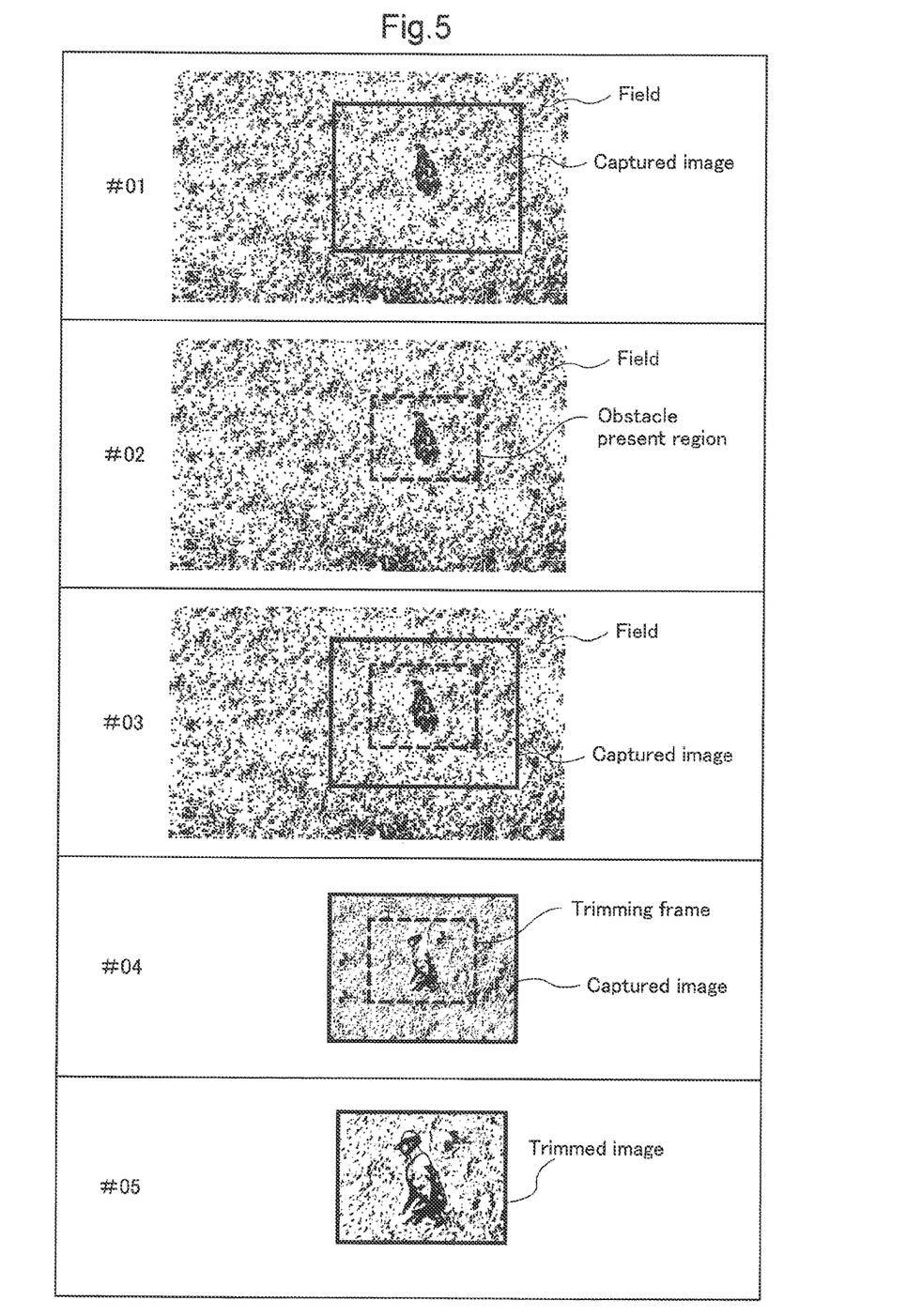
FIG. 5 is a schematic diagram showing data generated in processing steps performed in the obstacle detection system, in the form of images.

The obstacle processing unit 50 has a function of detecting the position (three-dimensional position) and the type of an obstacle based on a detection signal given from the LIDARs 21 and a captured image given from the camera 22. The obstacle processing unit 50 includes an image acquisition unit 51, an obstacle estimation unit 52, an image preprocessing unit 53, and an obstacle detection unit 54. Next, a flow of obstacle detection performed by the obstacle processing unit 50 will be described using FIGS. 4 and 5. In FIG. 5, data generated by the functional units shown in FIG. 4 is expressed as images.

The obstacle processing unit 50 operates substantially based on an obstacle detection program, which is a program that causes a computer to operate. Accordingly, the obstacle detection program includes an obstacle estimation function (obstacle estimation step), an image preprocessing function (image preprocessing step), and an obstacle detection function (obstacle detection step). In the image preprocessing step, a region in which an obstacle is present is estimated based on a detection signal from the LIDARs 21, and obstacle present region information is output. In the image preprocessing step, a captured image obtained using the camera 22 is trimmed based on shooting-angle-of-view information regarding the camera 22 and the obstacle present region information. At this time, the region in which the obstacle is present is included in the trimmed image. In the obstacle detection step, obstacle detection information that includes a detection result of the obstacle is output as a result of the trimmed image being input as an input image.

When the LIDARs 21 operate, a detection signal is output from the LIDARs 21, and when the camera 22 operates, a captured image is output from the camera 22 (#01 in FIG. 5). The image acquisition unit 51 stores captured images that are sent from the camera 22 at predetermined intervals in the memory by linking the captured images with machine positions calculated by the machine body position calculation unit 66. Furthermore, the image acquisition unit 51 manages, as the shooting-angle-of-view information, a shooting angle of view, which is necessary to calculate a region included in a captured image captured by the camera 22 at a predetermined position.

The obstacle estimation unit 52 stores the detection signal from the LIDARs 21 in the memory by linking the detection signal with a machine position calculated by the machine body position calculation unit 66, estimates an obstacle present region in the field in which an obstacle is present based on the detection signal, and outputs obstacle present region information (#02 in FIG. 5). Specifically, the obstacle estimation unit 52 accumulates detection signals sent from the LIDARs 21 and manages the detection signals in a three-dimensional space. Thus, three-dimensional point group data such as a three-dimensional radar image is obtained. Each point constituting the point group data has three-dimensional coordinate values (three-dimensional position). If there are no obstacles in the field, uniformly distributed point group data that is based on reflection beams from planted culm or a reaped surface of the field is obtained. However, if there is an obstacle that serves as a reflection body that reflects transmitted beams, a region in which the obstacle is present and that is characterized by reflection beams from the obstacle shows point group data that differs from point group data of other regions. Therefore, the region in which the obstacle is present can be estimated. The obstacle estimation unit 52 estimates the obstacle present region from point group data that indicates the region in which the obstacle is present, and outputs the estimated obstacle present region as obstacle present region information.

The image preprocessing unit 53 has a trimming region calculation processing function and a trimming processing function. In trimming region calculation processing, the region of the captured image in an obstacle estimated image is determined based on the obstacle present region information output from the obstacle estimation unit 52 and the shooting-angle-of-view information managed by the image acquisition unit 51 (#03 in FIG. 5).

An obstacle estimated region for which the presence of an obstacle is presumed is specified from the whole captured image. The outer frame of the obstacle estimated region is used as a trimming frame for the captured image, and therefore, trimming data that indicates the position of the trimming frame in the captured image is generated (#04 in FIG. 5).

In trimming processing, the captured image acquired by the image acquisition unit 51 is trimmed using the trimming frame to generate a trimmed image that corresponds to a region in the captured image (#05 in FIG. 5). The trimmed image including the estimated obstacle corresponds to a region in the captured image. Next, the trimmed image is given to the obstacle detection unit 54 as an input image of which the number of pixels has been reduced.

The obstacle detection unit 54 is constituted by a machine-learned neural network, and a deep learning algorithm is used for the obstacle detection unit 54. The deep learning algorithm usually requires a high-performance arithmetic unit. However, in this neural network, a trimmed image obtained by trimming a captured image so as to include a region for which the presence of an obstacle is presumed is used as an input image, and therefore, it is possible to quickly obtain an effective result without using a high-performance arithmetic unit. Obstacle detection information that is output includes detection results such as the type (human, animal, telegraph pole, etc.) of the obstacle and the position of the obstacle. The direction and distance from the machine body 10 to the obstacle can be calculated based on the obstacle detection information and the obstacle present region information. The obstacle detection information is given to the notification unit 67 to give notification of the detection of the obstacle.

The obstacle avoidance instruction generation unit 65 performs obstacle avoidance control based on the direction and distance from the machine body 10 to the obstacle. At this time, the obstacle avoidance instruction generation unit 65 generates an obstacle avoidance instruction by selecting the most appropriate instruction from a deceleration instruction, a stop instruction, a turn instruction, and the like for the machine body 10, and gives the obstacle avoidance instruction to the travel control module 60.

It should be noted that the constitutional elements constituting the obstacle processing unit 50 shown in FIGS. 3 and 4 are separated mainly for the purpose of description, and the constitutional elements may be integrated or divided as desired.

Other Embodiments

The following describes other embodiments obtained by modifying the above embodiment. Matter other than the matter described in the following other embodiments is similar to the matter described in the above embodiment. The above embodiment and the following other embodiments may be appropriately combined as long as no contradiction arises. It should be noted that the scope of the present invention is not limited to the above embodiment and the following other embodiments.

(1) In the above embodiment, the two LIDARs 21 that use optical beams (laser beams) are adopted as scanning beam-type obstacle sensors (scanning-type sensors), but the number of scanning beam-type obstacle sensors may be one or three or more. Furthermore, it is also possible to adopt, as a scanning beam-type obstacle sensor, an ultrasonic sensor that uses ultrasonic beams, an infrared sensor that uses infrared beams, or a radar that uses electromagnetic wave beams.

(2) In the above embodiment, a visible-light camera to which a wide angle lens is attached is adopted as the camera 22, but it is also possible to adopt an infrared camera or a hybrid camera that is constituted by a visible-light camera and an infrared camera.

(3) In the above embodiment, the LIDARs 21 and the camera 22 are attached to the front end of the grain discharge device 18, but it is of course possible to attach the LIDARs 21 and the camera 22 to other positions separately from each other. It is importance to monitor the front side in the traveling direction, and therefore, the LIDARs 21 and the camera 22 are preferably attached to the front portion of the combine, for example, the harvesting unit 15 or the front end of the ceiling of the driving unit 12.

(4) In the above embodiment, the obstacle detection unit 54 is constituted by a neural network for which machine learning has been performed using a deep learning algorithm, but the obstacle detection unit 54 may also be constituted by a neural network for which an algorithm other than the deep learning algorithm is used, for example, a recurrent neural network. Furthermore, it is also possible to adopt an image recognition technology other than the machine-learned neural network.

(5) The functions of the constitutional elements in the above embodiment may be configured as a control program that causes a computer to realize the functions. Also, the present invention may be configured as a recording medium on which the control program for causing a computer to realize the functions of the constitutional elements in the above embodiment is recorded. Also, the present invention may be configured as a control method in which processing performed by the constitutional elements in the above embodiment is performed in one or more steps.

(6) In the above embodiment, the normal-type combine is described as the agricultural work vehicle, but the agricultural work vehicle may be a head-feeding combine, a tractor, a rice transplanter, or the like, instead of the normal-type combine.

INDUSTRIAL APPLICABILITY

The present invention is applicable to an agricultural work vehicle for which obstacle detection is necessary.

DESCRIPTION OF REFERENCE SIGNS

10: Machine body
21: LIDAR (obstacle sensor)
22: Camera (image capturing unit)
50: Obstacle processing unit
51: Image acquisition unit
52: Obstacle estimation unit
53: Image preprocessing unit
54: Obstacle detection unit
6: Control unit
60: Travel control module
61: Travel control unit
62: Work control unit
63: Travel instruction unit
64: Travel route setting unit
65: Obstacle avoidance instruction generation unit
66: Machine body position calculation unit
80: Satellite positioning module
84: Notification device

The invention claimed is:
1. An obstacle detection system for an agricultural work vehicle, comprising:
an obstacle sensor configured to detect an obstacle in a field;
an obstacle estimation unit configured to estimate a region in the field based on a detection signal from the obstacle sensor in which region the obstacle is present and output obstacle present region information;
an image capturing unit configured to capture an image of the field and output the captured image;
an image preprocessing unit configured to generate a trimmed image based on the obstacle present region information and shooting-angle-of-view information regarding the image capturing unit which trimmed image is obtained by trimming the captured image so as to include the region in which the obstacle is present; and an obstacle detection unit configured to receive the trimmed image as an input image and output obstacle detection information that includes a result of the detection of the obstacle, wherein the obstacle sensor is a scanning sensor that uses ultrasonic beams, optical beams, or electromagnetic wave beams, and outputs the detection signal based on reflection beams that return to the obstacle sensor as a result of transmitted beams reflecting off a reflection body, wherein the obstacle estimation unit calculates a three-dimensional position of the obstacle from the detection signal with use of the reflection body as the obstacle, and outputs the obstacle present region information including the three-dimensional position, wherein the obstacle detection unit is configured as a machine-learned neural network, and wherein the obstacle detection information output based on the input image includes a type of the obstacle.

2. The obstacle detection system according to claim 1, wherein:

travel control of the agricultural work vehicle is changed to obstacle avoidance control based on the obstacle detection information output from the obstacle detection unit.

3. An agricultural work vehicle including an obstacle detection system, comprising:

an obstacle sensor configured to detect an obstacle in a surrounding region of the agricultural work vehicle;

an obstacle estimation unit configured to estimate a region based on a detection signal from the obstacle sensor in a region which the obstacle is present and output obstacle present region information;

an image capturing unit configured to capture an image of a surrounding region of the agricultural work vehicle and output the captured image;

an image preprocessing unit configured to generate a trimmed image based on the obstacle present region information and shooting-angle-of-view information regarding the image capturing unit which trimmed image is obtained by trimming the captured image so as to include the region in which the obstacle is present; and an obstacle detection unit configured to receive the trimmed image as an input image and output obstacle detection information that includes a result of the detection of the obstacle, wherein the obstacle sensor is a scanning sensor that uses ultrasonic beams, optical beams, or electromagnetic wave beams, and outputs the detection signal based on reflection beams that return to the obstacle sensor as a result of transmitted beams reflecting off a reflection body, wherein the obstacle estimation unit calculates a three-dimensional position of the obstacle from the detection signal with use of the reflection body as the obstacle, and outputs the obstacle present region information including the three-dimensional position, wherein the obstacle detection unit is configured as a machine-learned neural network, and wherein the obstacle detection information output based on the input image includes a type of the obstacle.

4. A non-transitory computer readable storage medium comprising an obstacle detection program for an agricultural work vehicle that, when executed by a computer comprising at least one processor, causes the computer to perform:

an obstacle estimation function of, based on a detection signal from an obstacle sensor that detects an obstacle in a surrounding region of the agricultural work vehicle, estimating a region in which the obstacle is present, and outputting obstacle present region information;

an image preprocessing function of generating a trimmed image, which is obtained by trimming a captured image of a surrounding region of the agricultural work vehicle so as to include the region in which the obstacle is present, based on the captured image, shooting-angle-of-view information regarding an image capturing unit that captured the captured image, and the obstacle present region information; and an obstacle detection function of receiving the trimmed image as an input image and outputting obstacle detection information that includes a result of the detection of the obstacle, wherein the obstacle sensor is a scanning sensor that uses ultrasonic beams, optical beams, or electromagnetic wave beams, and outputs the detection signal based on reflection beams that return to the obstacle sensor as a result of transmitted beams reflecting off a reflection body, wherein an obstacle estimation unit calculates a three-dimensional position of the obstacle from the detection signal with use of the reflection body as the obstacle, and outputs the obstacle present region information including the three-dimensional position, wherein the obstacle detection function is configured as a machine-learned neural network, and wherein the obstacle detection information output based on the input image includes a type of the obstacle.

5. A non-transitory computer readable recording medium comprising an obstacle detection program for an agricultural work vehicle, the obstacle detection program, when executed by a computer comprising at least one processor, causes the computer to perform:

an obstacle estimation function of estimating a region based on a detection signal from an obstacle sensor that detects an obstacle in a surrounding region of the agricultural work vehicle in which region the obstacle is present, and outputting obstacle present region information;

an image preprocessing function of generating a trimmed image, which is obtained by trimming a captured image of a surrounding region of the agricultural work vehicle so as to include the region in which the obstacle is present, based on the captured image, shooting-angle-of-view information regarding an image capturing unit that captured the captured image, and the obstacle present region information; and an obstacle detection function of receiving the trimmed image as an input image and outputting obstacle detection information that includes a result of the detection of the obstacle, wherein the obstacle sensor is a scanning sensor that uses ultrasonic beams, optical beams, or electromagnetic wave beams, and outputs the detection signal based on reflection beams that return to the obstacle sensor as a result of transmitted beams reflecting off a reflection body, wherein an obstacle estimation unit calculates a three-dimensional position of the obstacle from the detection signal with use of the reflection body as the obstacle, and outputs the obstacle present region information including the three-dimensional position, wherein the obstacle detection function is configured as a machine-learned neural network, and wherein the obstacle detection information output based on the input image includes a type of the obstacle.

6. An obstacle detection method for an agricultural work vehicle, comprising:

estimating a region based on a detection signal from an obstacle sensor that detects an obstacle in a surrounding region of the agricultural work vehicle in which region the obstacle is present, and outputting obstacle present region information;

generating a trimmed image, which is obtained by trimming a captured image of a surrounding region of the agricultural work vehicle so as to include the region in which the obstacle is present, based on the captured image, shooting-angle-of-view information regarding an image capturing unit that captured the captured image, and the obstacle present region information; and receiving the trimmed image as an input image and outputting obstacle detection information that includes a result of the detection of the obstacle, wherein the obstacle sensor is a scanning sensor that uses ultrasonic beams, optical beams, or electromagnetic wave beams, and outputs the detection signal based on reflection beams that return to the obstacle sensor as a result of transmitted beams reflecting off a reflection body, wherein an obstacle estimation unit calculates a three-dimensional position of the obstacle from the detection signal with use of the reflection body as the obstacle, and outputs the obstacle present region information including the three-dimensional position, wherein a machine-learned neural network is used for the receiving of the trimmed image and the outputting of the obstacle detection information, and wherein the obstacle detection information output based on the input image includes a type of the obstacle.

* * * * *